US012231315B2

(12) United States Patent
Kanekar et al.

(10) Patent No.: US 12,231,315 B2
(45) Date of Patent: Feb. 18, 2025

(54) COLLECTING AND VISUALIZING HEALTH PROFILE DATA OF RADIO ACCESS NETWORK COMPONENTS

(71) Applicant: Microsoft Technology Licensing, LLC, Redmond, WA (US)

(72) Inventors: Bhushan Mangesh Kanekar, Saratoga, CA (US); Prateek Mittal, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 17/827,112

(22) Filed: May 27, 2022

(65) Prior Publication Data
US 2023/0388208 A1 Nov. 30, 2023

(51) Int. Cl.
*H04L 41/06* (2022.01)
*H04L 43/0817* (2022.01)
*H04W 24/04* (2009.01)
*H04W 24/10* (2009.01)
*H04L 41/046* (2022.01)

(52) U.S. Cl.
CPC .......... *H04L 43/0817* (2013.01); *H04L 41/06* (2013.01); *H04W 24/04* (2013.01); *H04W 24/10* (2013.01); *H04L 41/046* (2013.01)

(58) Field of Classification Search
CPC .......................... H04L 41/046; H04L 43/0817
USPC ........................................................ 455/423
See application file for complete search history.

(56) References Cited

U.S. PATENT DOCUMENTS

| | | | | |
|---|---|---|---|---|
| 2017/0310542 | A1* | 10/2017 | Nair ..................... | H04W 24/08 |
| 2019/0068619 | A1* | 2/2019 | Fan ....................... | H04L 41/064 |
| 2020/0382361 | A1* | 12/2020 | Chandrasekhar ...... | G06N 3/044 |
| 2022/0399271 | A1* | 12/2022 | Chen .................. | H01L 23/53209 |

OTHER PUBLICATIONS

"International Search Report and Written Opinion Issued in PCT Application No. PCT/US23/018234", Mailed Date: Jul. 12, 2023, 17 Pages.

* cited by examiner

*Primary Examiner* — Qutbuddin Ghulamali
(74) *Attorney, Agent, or Firm* — Ray Quinney & Nebeker; James Bullough

(57) ABSTRACT

The present disclosure relates to systems, methods, and computer-readable media for collecting operational data across a plurality of radio access network (RAN) components for determining and presenting a health profile for the RAN components. Systems described herein involve implementing event tracking agents on the RAN components, compiling instances of detected events via event streams from the respective RAN components, and determining a health profile that reflects a current or predicted health state for components that make up a RAN. The systems described herein may further generate and present a health profile presentation including interactive icons and features that enable an individual to view health profile data for specific RAN sites, RAN components, and even user devices associated with the tracked events. Systems described herein may perform various mitigation actions to overcome poor health conditions as they are observed or predicted over time.

20 Claims, 9 Drawing Sheets

COLLECTING AND VISUALIZING HEALTH PROFILE DATA OF RADIO ACCESS NETWORK COMPONENTS

BACKGROUND

Cellular networks can provide computing devices (e.g., mobile devices) with access to services available from one or more data networks. A cellular network is typically distributed over geographical areas that often include base stations, core networks, and/or edge networks that collectively provide a variety of services and coverage to end-user devices (e.g., mobile devices). The devices of the cellular network provide reliable access to a data network by mobile devices over a wide geographic area. In many instances these cellular networks provide mobile devices access to the cloud.

As noted above, cellular networks include a number of network components. For example, cellular networks often include a radio access network (RAN) components, edge network components, and core network components. In many instances, the RAN may include base stations having components thereon that communicate wirelessly with user devices (e.g., mobile devices or other endpoints) and facilitate interaction with other components of a core network and/or cloud computing system.

In many cellular environments, RAN components are hosted or otherwise operated by different entities than other components within the cellular network. For example, RAN components are often maintained and operated by cellular carriers or other vendors while core network, edge network, and cloud computing components are maintained and operated by other entities. Due to the non-uniform ownership and management of the different components, there are often difficulties in determining which of the various components are failing or underperforming in connection with different applications. For example, while individual components may locally track data for internal use, this data is typically not shared between different devices of the cellular environment. Moreover, where RAN components at different sites (e.g., at different base stations) are often owned by different vendors altogether, tracking and diagnosing network failures and other problems becomes increasingly complex and difficult.

These and other problems exist in connection with collecting operational data and diagnosing network performance in a cellular network, and particularly in connection with RAN components on the cellular network.

DETAILED DESCRIPTION

Figure 1:
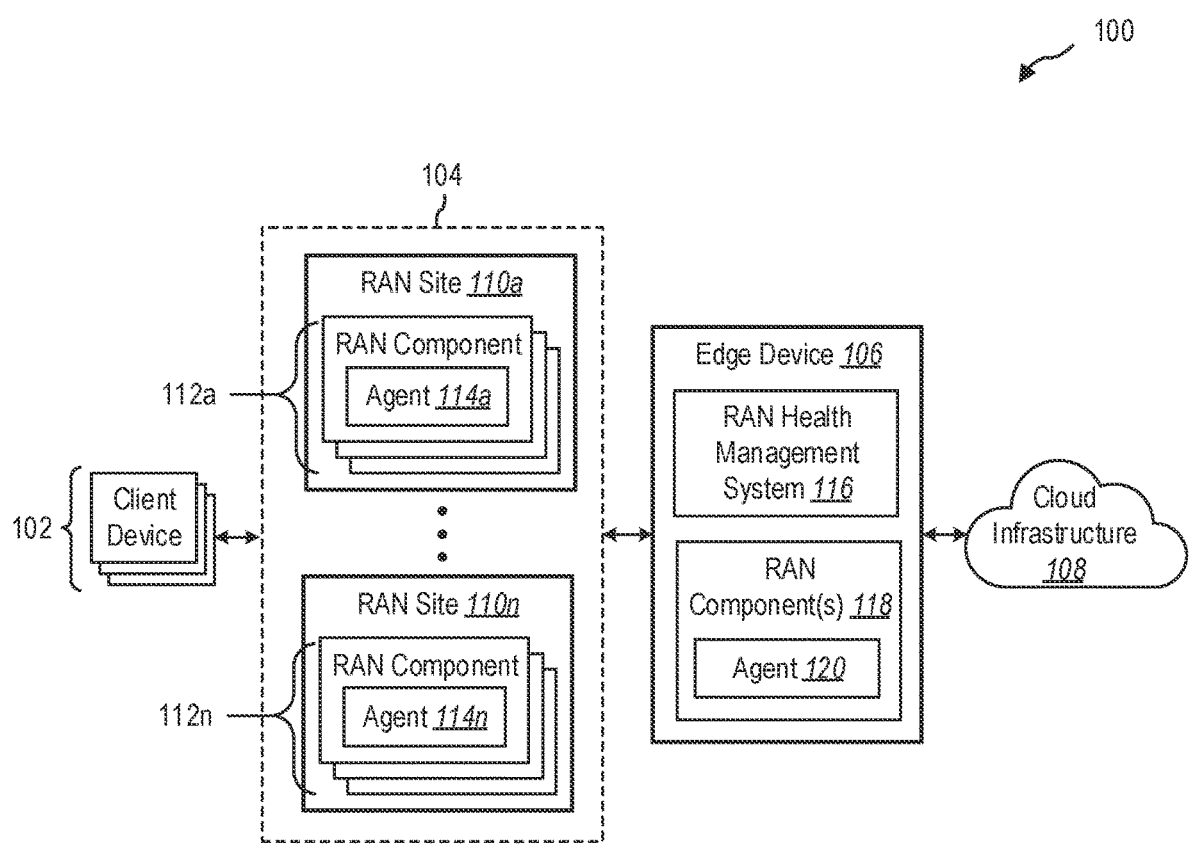
FIG. 1 illustrates an example environment including a RAN health management system in accordance with one or more embodiments.

The present disclosure relates generally to systems, methods, and computer-readable media for collecting operational data across a plurality of radio access network (RAN) components for determining and presenting a health profile for the RAN components. In particular, as will be discussed in further detail herein, the present disclosure involves implementing a RAN health management system capable of collecting streams of tracked network events (or simply "events") and aggregating operational data within event matrixes. Based on the aggregated event data, the RAN health management system may determine health profile(s) for any number of RAN sites and associated RAN components and generate a health profile presentation that includes diagnosed health states for the respective RAN sites and components. The RAN health management system may filter and present this operational data in a variety of ways, as will be discussed in connection with a variety of examples and implementations herein.

As an illustrative example, the RAN health management system may implement a method for diagnosing health states for components (e.g., RAN components) of a RAN environment (e.g., including one or multiple RAN sites). The RAN health management system may collect operational data for a plurality of RAN components for one or more RAN sites. The RAN health management system may identify health parameters for the RAN site(s) indicating one or more threshold conditions associated with a state of health for the plurality of RAN components. The RAN health management system may determine a health profile for the one or more RAN sites indicating health state(s) for the RAN site(s) as well as respective health states for the individual RAN components. The RAN health management system may provide a health profile presentation including a plurality of interactive icons associated with the various health states that facilitate presentation of the operational data with respect to specific events, RAN components, and even device identifiers (e.g., subscriber identity module identifiers (SIM IDs) of the associated RAN site(s).

As will be discussed in further detail below, the present disclosure includes a number of practical applications having features described herein that provide benefits and/or solve problems associated with accessing operational data across one or multiple RAN sites, diagnosing health conditions for the components of the RAN sites, and presenting the diagnosed health conditions in a way that enables an individual to view and understand the health states of the various components. Some example benefits are discussed herein in connection with various features and functionalities provided by a RAN health management system. It will be appreciated that benefits discussed herein in connection one or more embodiments are provided by way of example and are not intended to be an exhaustive list of all possible benefits of the RAN health management system.

For example, by deploying an event detection agent on each of multiple RAN components, the RAN health management system enables each of any number of RAN components to locally detect specific events and provide a stream of the identified events to one of a variety of services on a cloud computing system. This local implementation of the event detection agents provides a scalable approach to detecting various events across multiple geographic sites, as well as across multiple RAN components within respective sites. Moreover, where certain RAN components are virtual implementations on an edge network or other portion of a cloud computing system, the event detection agents may provide even further flexibility with respect to locally detecting a wide variety of events on various RAN components.

The deployment of agents on the respective RAN components facilitates flexibility in the types of operational data that can be collected by the RAN health management system. For example, the RAN health management system may deploy different instructions that cause the locally deployed agents to detect and provide indications of different types of events. Deployment of the different instructions may be based on unique capabilities of the RAN sites and/or RAN components.

The instructions for tracking events and collecting operational data may further be modified in a scalable way to track new or different types of events over time. For example, the RAN health management system may update event thresholds, indicate different combinations of data signals that constitute various events, or otherwise modify instructions on the agents to detect events or otherwise gather operational data from the respective RAN components. Thus, where a diagnosis or prediction model would provide more accurate health profile data with additional information, the RAN health management system may update instructions on the deployed agents on a large scale (e.g., across multiple RAN sites) or a targeted scale (e.g., on specific RAN components, RAN component-types, or for specific RAN sites) to collect the relevant operational data in a way that further augments the health profile information.

In one or more embodiments, the RAN health management system associates tags or other identifiers with corresponding events in a way that enables generation of an event matrix that can be processed or filtered in a variety of useful ways. For example, by tagging event entries with RAN site identifiers, RAN component identifiers, timestamps and, in some instances, device identifiers (e.g., SIM IDs), the RAN health management system can generate a searchable data object that enables an individual to selectively view operational data and diagnose health profile information for selective portions of a RAN network.

Indeed, by generating an event matrix in accordance with one or more embodiments described herein, the RAN health management system facilitates presentation of health profile data for specific RAN sites, specific RAN components, and specific user devices. Moreover, features of the event matrix enable an individual to view when and where specific components are failing while providing additional information associated with the network failures (or other events contributing to poor health of the RAN).

As will be discussed in further detail, the RAN health management system may provide a presentation including information from a health profile indicative of a current health state as well as a predicted health state for portions of a RAN. For example, the RAN health management user system may provide a presentation indicating a current health state of a RAN site, specific RAN components of the RAN site, and any number of user devices in communication with the RAN site over some period of time. The RAN health management system may similarly view predicted performance of the RAN site, RAN components, and user devices over some upcoming period of time.

This identification of current and/or future health related issues allows an individual to identify and acuate different actions that can be performed to overcome an unhealthy health profile for a RAN site (or specific RAN components) and, in some cases, prevent future instances of bad health conditions. Furthermore, because the RAN health management system can collect and present health profile data at variable levels of granularity, the RAN health management system can enable diagnosis of current or predicted network health issues for specific components of the RAN network.

This granular diagnosis of RAN health issues allows an individual (e.g., RAN administrator) to scale up or otherwise increase capacity of the RAN on a targeted or otherwise selective basis, such as activating certain RAN components on a particular RAN site based on an accurate diagnosis of the specific network health issues. This can be done as an alternative to a more robust and less energy efficient approach, such as simply increasing capacity (e.g., bandwidth) on as site-wide or network-wide basis. Indeed, this targeted approach can significantly reduce excess power consumption and processing resource of one or more RAN sites due to accurately identifying a portion of the RAN (e.g., a specific RAN site, a specific RAN component) that is currently experiencing poor health conditions or is predicted to experience poor health conditions in the future.

As will be discussed in further detail below, one or more embodiments described herein involves presenting diagnosis and/or prediction data via a health profile presentation. In one or more embodiments described herein, the health profile presentation includes interactive features that enables an individual to view a health status (or predicted health status) for each specific RAN site as well as more granular RAN component. In one or more examples herein, the RAN health management system enables a user to interact with icons of the presentation to drill down and view performance of specific RAN components and/or specific user devices. Indeed, in some instances, because of the aggregation of the distributed operational data, the performance of user devices can be compared across multiple RAN sites, which is information that has been previously unavailable in conventional RAN systems.

Each of the above benefits may also be provided without interrupting normal operations of the RAN components. For example, the agent may simply constitute an application programming interface (API) having a set of instructions deployed thereon that enables the agent to simply observe network events and provide an indication of a particular event as it occurs. This can be provided via a data stream to the RAN health management system (or other cloud-based service) without causing significant processing overhead on the RAN component(s). Indeed, as will be discussed herein, the agent may simply leverage the data signals that the RAN component is already known to track and simply observe the normal operation of the RAN component to detect the various network events. This collected data can be analyzed by the RAN health management system to accurately determine or predict a health profile for components of the RAN without interrupting normal operation of the RAN sites.

As illustrated in the foregoing discussion and as will be discussed in further detail herein, the present disclosure utilizes a variety of terms to described features and advantages of methods and systems described herein. Some of these terms will be discussed in further detail below.

As used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. Moreover, in one or more embodiments a data network may be implemented on the same or on a different cloud computing network as the portion of the cellular network.

In one or more embodiments, the cloud computing system includes one or more edge networks. As used herein, an "edge network" may refer to an extension of the cloud computing system located on a periphery of the cloud computing system. The edge network may refer to a hierarchy of one or more devices that provide connectivity to devices and/or services on a datacenter within a cloud computing system framework. An edge network may provide a number of cloud computing services on hardware having associated configurations in force without requiring that a client communicate with internal components of the cloud computing infrastructure. Indeed, edge networks provide virtual access points that enables more direct communication with components of the cloud computing system than another entry point, such as a public entry point, to the cloud computing system.

As used herein, a "RAN component" may refer to any device or functional module that provides radio access functionality on a cellular network. RAN components may refer to physical components implemented at a RAN site, such as a base station or set of co-located base stations. RAN components may also refer to virtualized components, such as a service instance deployed on an edge network or datacenter of a cloud computing system. By way of example and not limitation, RAN components may refer to routers, firewalls, antennas, or any device or other functional component (e.g., a virtualized service) that facilitates a connection between an endpoint (e.g., a user device, such as a cell phone) and a core network.

As noted above, and as will be discussed in further detail below, a RAN component may track or otherwise collect data signals. As used herein, a "data signal" may refer to one or more pieces of operational data observed or otherwise detected by a RAN component in connection with one or more communication packets (or simply "communications") that are transmitted to or from an endpoint. A data signal may include any information in connection with a communication, such as a device identifier or subscriber identity module identifier (SIM ID), a timestamp, a site identifier, a geographic location, other communication characteristics, or any other information that can be obtained from a communication to or from a client device. As will be discussed below, different RAN components may detect or otherwise track different sets of data signals depending on capabilities of the RAN component(s).

As used herein, a "network event" or simply "event" may refer to a set of one or more data signals that have been defined as a particular occurrence. For example, an event may refer to a specific data signal or combination of multiple data signals that, when observed, constitute an associated network event. In one or more embodiments, an event may refer to any detected data signal that is defined as an event, such as a detected SIM ID, timestamp, site identifier, etc. In one or more implementations, an event may refer to a defined combination of data signals, such as a dropped call or a failed communication. In one or more embodiments, an event may refer to a trigger or observed threshold, such as a threshold number of dropped calls or failed communications, or a detected bandwidth that surpasses a high threshold over some period of time. Indeed, a network event may refer to any combination of any number of data signals that may be defined by a set of instructions that are deployed on an event detection agent.

As used herein, an "event detection agent" (or simply "agent") refers to a service or interface deployed on a RAN component that is configured to detect a network event. In one or more embodiments, an event detection agent refers to a software agent capable of observing data signals tracked by a RAN component and determining whether the observed data signals constitute various events. As noted above, in one or more implementations, the event detection agent includes an API that provides a mechanism whereby the event detection agent can transmit a data stream including any indicated events observed on the RAN component. As will be discussed in further detail herein, the event detection agents deployed on different RAN components may include similar or different sets of instructions for detecting the same or different network events. The specific events detectable by a given event detection agent may be based on a corresponding set of data signals that are published or otherwise provided by a corresponding RAN component.

As used herein, a "health profile" may refer to current or predicted states of functionality of different components on a RAN. For example, a health profile may refer to a current (or predicted) status of network functionality for a specific RAN site, a specific RAN components, a specific user device in communication with the RAN site, or any combination of health for multiple components or sites that make up a RAN. In one or more embodiments, a health profile for a RAN site may include a health status for the site as a whole in combination with health states for any number of RAN components of the RAN site.

As will be discussed in further detail below, a health state may be based on a comparison of operational data (e.g., detected events) and various health parameters (e.g., event or data thresholds). As an example, a RAN component having available bandwidth above a threshold bandwidth may be considered healthy (e.g., a health state) while the same or different RAN component having available bandwidth below the threshold bandwidth would be considered unhealthy. Other implementations may involve tracking a number of events with respect to certain RAN components and determining a health state based on a comparison of the number of events to a predetermined threshold.

As used herein, a "health profile presentation" may include any presented data related to a health profile of a RAN, a RAN site, a RAN component, or any combination of multiple sites, components, and/or user devices. In one or more embodiments described herein, a health profile presentation includes interactive icons that enable a user to drill down and view health profile data at different levels of granularity. In one or more embodiments, a health profile presentation may refer to a file or data object that is provided to a client device that, when provided to the client device, causes the device to display icons indicating health states (or predicted health states) for the various portions of a RAN.

Additional detail will now be provided regarding systems described herein in relation to illustrative figures portraying example implementations. For example, FIG. 1 illustrates an example environment 100 for implementing features and functionality of a RAN health management system in accordance with examples described herein. As shown in FIG. 1, the environment 100 illustrates example portions of a cellular network including a set of client devices 102, a radio access network 104 (or simply "RAN 104"), an edge device 106, and an internal cloud infrastructure 108. These components 102-108 may collectively form a public or private cellular network, which include a RAN, a core network, and a data network. Moreover, any portion(s) of the cellular network may be implemented on a cloud computing system inclusive of the edge device 106 (and other edge devices) and the cloud infrastructure 108 (e.g., a cloud datacenter).

As further shown in FIG. 1, the RAN 104 may include a plurality of RAN sites 110a-n. Each RAN site may include a plurality of RAN components 112a-n and agents 114a-n (e.g., event detection agents) deployed thereon. For example, a first RAN site 110a may include a plurality of RAN components 112a (e.g., physical RAN components) having a first set of agents 114a deployed thereon. Each of the additional RAN sites may include similar RAN components and agents deployed thereon. The RAN sites 110a-n may refer to RAN components 112a-n implemented at respective geographic sites. Further, the agents 114a-n may refer to event detection agents having varying sets of instructions deployed thereon.

As noted above, the environment 100 may include an edge device 106. As shown in FIG. 1, the edge device 106 may include a RAN health management system 116 implemented thereon. The RAN health management system 116 may perform various features described herein in connection with collecting operational data (e.g., event data), determining health states for RAN sites 110a-n and corresponding components of the RAN 104, and providing a health profile presentation including indications of health states and/or predicted health states for one or more RAN sites 110a-n.

As shown in FIG. 1, the edge device 106 may include one or more RAN component(s) 118 deployed thereon. The RAN component(s) 118 may refer to virtualized RAN components that are implemented in the form of cloud computing services. As a non-limiting example, the RAN component(s) 118 could be a firewall, load balancer, a filter, or any other cloud-based RAN service or microservice that enhances features and functionality of the RAN 104

As shown in FIG. 1, the virtualized RAN component(s) 118 may include an agent 120 implemented thereon. Similar to the agents 114a-n on the physical RAN components 112a-n, the agent 120 on the RAN component(s) 118 may be configured with a set of instructions that define various network events and which facilitate locally identifying occurrence of various events and providing an event stream to the RAN health management system 116. While not shown in FIG. 1, in one or more embodiments, the cloud infrastructure 108 may additionally include one or more RAN components and associated agents deployed thereon for detecting various events and providing an event stream of operational data to the RAN health management system 116.

The client devices 102 may refer to a variety of computing devices or device endpoints including, by way of example, a mobile device such as a mobile telephone, a smartphone, a personal digital assistant (PDA), a tablet, or a laptop. Alternatively, one or more of the client devices 102 may refer to non-mobile devices such as a desktop computer, a server device (e.g., an edge network server), or other non-portable devices. In one or more embodiments, the client devices 102 refer more generally to any endpoint capable of communicating with devices on a cloud computing system, such as Internet of Things (IoT) devices, or other Internet-enabled devices. In one or more embodiments, the client devices 102 refer to applications or software constructs on corresponding computing devices. Each of the devices, including the client devices 102, edge device(s) 106, and other computing devices described herein may include features and functionality described generally below in connection with FIG. 7.

The RAN sites 110a-n may refer to base stations or other geographic RAN infrastructures that are hosted, administered, or otherwise maintained by a particular entity. For example, different RAN sites 110a-n may be maintained by a third-party vendor and may be implemented using different hardware having different specifications or data tracking capabilities. Thus, while specific examples are discussed herein in connection with specific RAN sites and specific RAN components, it will be appreciated that features described in connection with agents deployed on the respective RAN components are applicable to a wide variety of RAN sites and components. These features are applicable across different sites and components notwithstanding different protocols and different data signals that are obtained and tracked by the different RAN components.

The edge device 106 may refer to one or multiple edge devices of an edge network. The edge device 106 may be implemented as part of a private or public network and may refer to a server rack (or multiple server racks) having computing nodes deployed on the edge of a cloud computing system. For example, the edge device 106 may refer to a server node (or one or more racks of server nodes) deployed at an edge location and having a virtual network connection with the cloud infrastructure 108.

As noted above, the features and functionality of the RAN components 112a-n, 118 and the RAN health management system 116 may be utilized in a cellular network including, by way of example, a RAN, a core network, and/or a data network. In one or more embodiments, the cellular network is configured in accordance with a 4G standard and/or a 5G standard. Nevertheless, the RAN health management system 116 may be implemented on any cellular network that relies on RAN components and which can utilize operational data that is tracked and received by the agents 114a-n deployed thereon.

Figure 2:
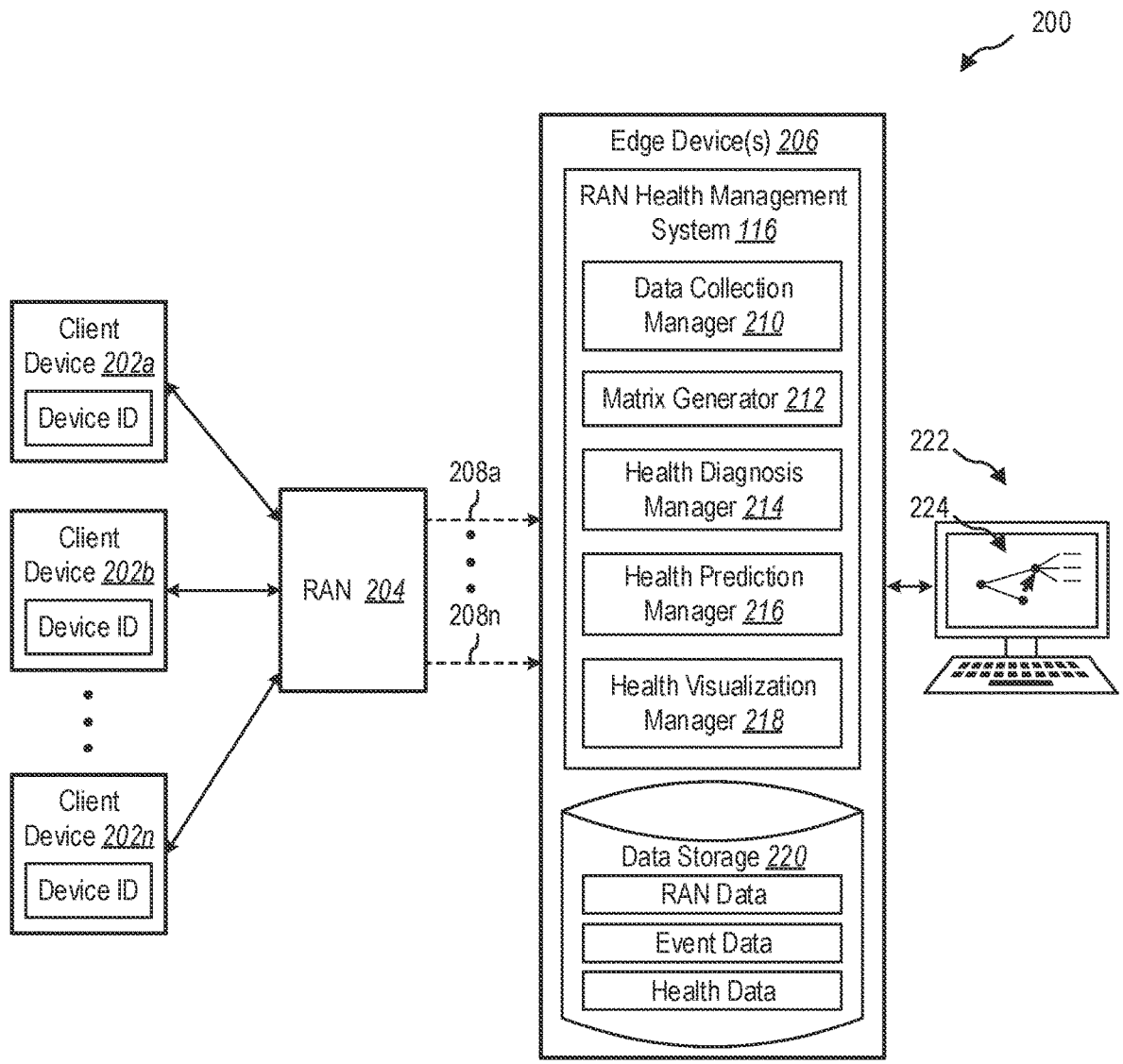
FIG. 2 illustrates an example environment showing implementation of a RAN health management system on an edge network in accordance with one or more embodiments.

Additional detail will now be discussed in connection with a RAN health management system 116 deployed on an edge device and in communication with a RAN network. For example, FIG. 2 illustrates an example environment 200 including a plurality of client devices 202a-n, a RAN 204, and one or more edge devices 206 that are deployed as part of an edge network. The client devices 202a-n, RAN 204, and edge device(s) 206 may be examples of similar components discussed above in connection with FIG. 1.

As shown in FIG. 2, the client devices 202a-n may include respective device identifiers that may be used to identify specific devices 202a-n in communication with the RAN site 204. For example, the device identifiers may refer to SIM IDs or other unique identifiers (e.g., global unique identifiers) associated with respective devices or hardware. As will be discussed below, the device identifiers may be associated with certain communications (e.g., network packets), which may be tagged or otherwise associated with detected events that are collected by the RAN health management system 116. In the example shown in FIG. 2, the plurality of client devices 202*a-n* may refer to client devices that are within a proximity one or more RAN sites of the RAN 204 such that communications originating from the respective client devices 202*a-n* are relayed or otherwise transmitted via a corresponding RAN site.

The RAN 204 may include any number of RAN sites having a plurality of RAN components thereon. As discussed above, each of the RAN components may have an agent deployed thereon being configured to detect various events and provide an indication of the detected events to the RAN health management system 116 on the edge device(s) 206. As shown in FIG. 2, and as will be discussed in further detail below, the RAN components of the RAN 204 may provide a plurality of event streams 208*a-n* to the RAN health management system 116 for further processing. Each of the event streams 208*a-n* may refer to an event stream originating from a corresponding RAN component having an event detection agent deployed thereon.

Additional detail will now be given in connection with the RAN health management system 116. For example, as shown in FIG. 2, the RAN health management system 116 may include a plurality of components 210-218 for providing features and functionality of the RAN health management system 116 herein. While certain components are described in connection with software or hardware modules implemented on a single edge device 206, it will be appreciated that one or more of the components 210-218 (or discrete functionalities of respective components) may be implemented across a plurality of devices. For example, one or more components 210-218 of the RAN health management system 116 may be implemented across multiple edge devices of an edge network. As another example, one or more components 210-218 may be implemented across a combination of edge devices and an internal cloud infrastructure.

As shown in FIG. 2, the RAN health management system 116 includes a data collection manager 210. Generally speaking, the data collection manager 210 may implement any features and functionalities in connection with deploying agents on discrete RAN components of the RAN 204. For example, the data collection manager 210 may deploy agents having instructions thereon for detecting various network events experienced by the respective RAN components.

As noted above, the event detection agents, once deployed on the respective RAN components, may include instructions for detecting a variety of events based on data signals tracked by the corresponding RAN components. The events may include a wide variety of events based on detected signals (e.g., dropped packets), measured network metrics (e.g., bandwidth), or any combination of signals that constitute a network event. Indeed, it will be appreciated that the agents on the respective RAN components facilitate local tracking and collection of network events and any other operational data, which can then be provided to the data collection manager 210 for further processing.

In one or more embodiments, the operational data is provided to the data collection manager 210 via a plurality of event streams 208*a-n*. As used herein, an event stream refers to a real-time stream of data including events detected by an event detection agent on an associated RAN component. In one or more embodiments, an event stream includes indications of events provided to the data collection manager 210 in real-time at a time when the network event is detected by the RAN component(s).

As will be discussed in further detail herein, the event streams 208*a-n* may include indications of detected events and corresponding data (e.g., metadata) associated with the detected event. For example, in addition to indications that certain events were detected by the RAN component(s), the event streams 208*a-n* may include further indicators, such as a site identifier indicating a corresponding RAN site, a RAN identifier indicating one of a plurality of RANs on the RAN site, and a timestamp indicating a time of an associated event. In one or more embodiments, the event streams 208*a-n* may further include a device identifier indicating an associated end-user device (and any additional information associated with the device) corresponding to the detected event.

The data collection manager 210 may include a wide variety of features and functionalities in connection with deploying the agents, discovering tracking capabilities of the RAN components, collecting the event data, and further processing the collected data. In one or more embodiments, the data collection manager 210 may include features and functionality of a data collection management system described in U.S. patent application Ser. No. 17/748,081 entitled FACILITATING COLLECTION OF EVENTS DETECTED BY RADIO ACCESS NETWORK COMPONENTS, the entirety of which is incorporated herein by reference.

As further shown in FIG. 2, the RAN health management system 116 may include a matrix generator 212. Upon receiving the operational data via the event streams 208*a-n*, the matrix generator 212 may compile or otherwise aggregate the operational data within an event matrix. In one or more embodiments, the matrix generator 212 generates an event matrix by compiling event entries for respective events detected by the agents on the RAN components. In one or more embodiments, the matrix generator 212 generates event entries by tagging each event instance with a set of identifiers (e.g., event metadata) that may be used to uniquely identify each of the detected events. Additional information in connection with tagging events and compiling the event matrix will be discussed in further detail below in connection with FIG. 3A.

As further shown in FIG. 2, the RAN health management system 116 may include a health diagnosis manager 214. The health diagnosis manager 214 may determine a health profile for the RAN 204, including health state(s) for any specific RAN site and associated RAN components. In one or more embodiments, the health diagnosis manager 214 determines a health profile for one or more RAN sites based on information contained within the health matrix and based on various health parameters (e.g., health thresholds) determined for the respective RAN components/sites. Additional information in connection with determining a health profile and associate health states will be discussed below in connection with FIG. 3B.

As further shown in FIG. 2, the RAN health management system 116 may include a health prediction manager 216. Similar to determining the health profile for the RAN 204 and associated RAN sites, the health prediction manager 216 may determine a predicted health profile for the RAN sites and associated RAN components. In one or more embodiments, the health prediction manager 216 may determine the predicted health profiles based on historical data and observed trends. Additional information in connection with determining a predicted health profile will be discussed below in connection with FIG. 3C.

As further shown in FIG. 2, the RAN health management system 116 may include a health visualization manager 218.

In one or more embodiments, the health visualization manager 218 may visualize a health profile by generating a health profile presentation for one or more RAN sites. The health profile presentation may include a variety of displayed features to illustrate a current state of health for one or more RAN sites of the RAN 204. The health visualization manager 218 may additionally include a display of health states for corresponding RAN components. In further implementations, the health visualization manager 218 may provide a display of health states for specific client devices 202a-n.

In addition to generally providing a presentation of various health states for components or devices associated with the RAN 204, the health visualization manager 218 may provide a variety of interactive features that enable an individual to view additional health information for the RAN 204. For example, as shown in FIG. 2, the health visualization manager 218 may provide a health profile presentation to a client device 222 for display via a graphical user interface 224 of the client device 222. Based on detected user interactions with icons presented via the display of the health profile presentation, the health visualization manager 218 may provide varying levels of granular information associated with health states of specific components and sub-components of the RAN 204. Additional information in connection with generating and presenting the health profile presentation will be discussed in connection with various examples illustrated in FIGS. 4A-5C.

Also shown in FIG. 2 is a data storage 220 including different types of data accessible thereon. For example, as shown in FIG. 2, the data storage 220 may include RAN data, event data, and health data. The RAN data may refer to any information associated with the RAN 204 and any associated RAN components. The event data may refer to any information associated with how events are detected or defined as well as any of the information included with the event matrixes described herein. The health data may refer to any information associated with a determined health profile of any device(s) of the various environments described herein as well as any health parameters relied on to determine particular health states.

As shown in FIG. 2, the data storage 220 may refer to a storage located on one or more edge device(s) 206. Alternatively, some or all of the data of the data storage 220 may be obtainable by the RAN health management system 116 from other devices, such as additional edge devices and/or remote devices hosted by a datacenter on a cloud computing system.

Figure 3A:
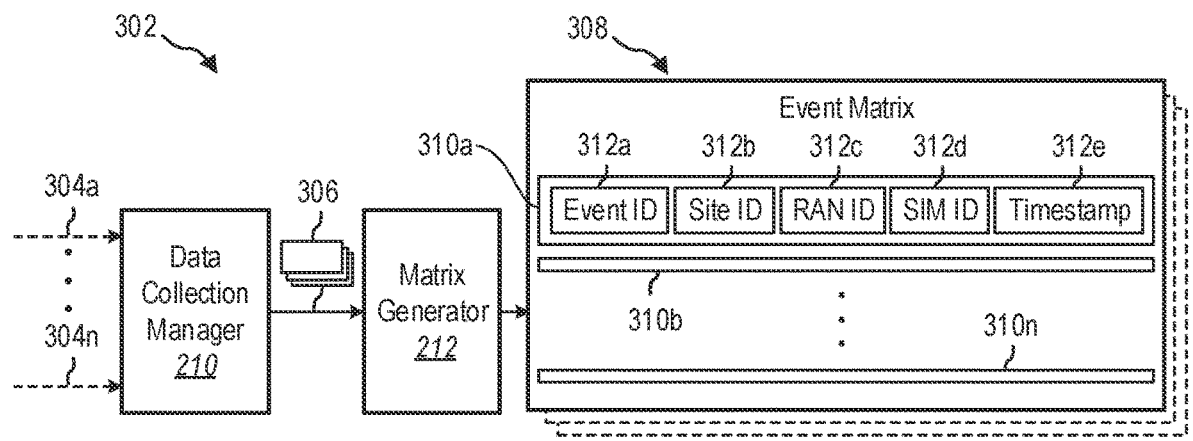
FIG. 3A illustrates an example implementation in which the RAN health management system collects operational data and generates an event matrix in accordance with one or more embodiments.

Turning now to FIG. 3A, additional information will now be discussed in connection with generating an event matrix based on operational data collected by the RAN health management system 116. FIG. 3A illustrates an example workflow 302 showing an implementation of the data collection manager 210 and the matrix generator 212 in accordance with one or more embodiments. As shown in FIG. 3A, the data collection manager 210 may receive a plurality of event streams 304a-n detected event instances from a plurality of RAN components. In one or more embodiments, each of the event streams 304a-n are associated with a respective RAN component having an agent implemented thereon being configured to detect a variety of network events. As further shown in FIG. 3A, the data collection manager 210 can provide the event instances 306 to the matrix generator 212 for further processing.

Upon receiving the event instances from the respective event streams 304a-n, the matrix generator 212 can generate an event matrix 308. As shown in FIG. 3A, the matrix generator 212 may aggregate or otherwise compile the event instances by generating a plurality of event entries 310a-n corresponding to the received event instances. Indeed, in one or more embodiments, the matrix generator 212 may create a new event entry for each event instance detected by the RAN components on the respective RAN sites.

As noted above, the events may correspond to different combinations of data signals or, in some instances, simply refer to detected data signals that have been defined as detectable events. For example, in one or more embodiments, an event may refer to a combination of data signals, such as a dropped communication packet at a particular RAN component. As another example, an event may refer to a network metric, such as a detected bandwidth at a RAN component. As further noted, the data collection manager 210 may collect any number of different event types.

In generating the event matrix 308, the matrix generator 212 may generate event entries including an indication of specific event types. In one or more embodiments, the matrix generator 212 may generate specific matrixes for different event types. For instance, a first event matrix may include any number of event entries for a first event type (e.g., measured bandwidths) while a second event matrix may include any number of event entries for a second event type (e.g., dropped communication packets). As indicated by dotted boxes, the matrix generator 212 may generate any number of data matrixes, which may correspond to entries of specific event types. Thus, compiling or otherwise aggregating the event instances may involve organizing the event entries within matrixes of different event types.

As shown in FIG. 3A, the event matrix 308 may include a plurality of event entries 310 having a plurality of event identifiers 312a-e associated therewith. The event identifiers 312a-e may include a wide variety of identifiers that may be used to uniquely identify a particular event within the event matrix(es) 308. By way of example, the identifiers may include an event identifier 312a, which may refer to an identification of a particular type of event. In one or more embodiments, the event identifier 312a may refer to a unique identifier associated with a unique event.

As further shown, the identifiers may include a site identifier 312b. The site identifier 312b may refer to an identifier of a particular RAN site. As further shown, the identifiers may include a RAN identifier 312c. The RAN identifier 312 may refer to an identifier of a specific RAN component (or type of RAN component). The RAN identifier 312 may be unique to the specific component or, alternatively, refer to a type of RAN component that may be located at different RAN sites. The identifiers may further include a device identifier 312d. In one or more embodiments, the device identifier 312d refers to a SIM ID that uniquely identifies an endpoint or user device capable of communicating with components of a RAN. The identifiers may further include a timestamp 312e, which may refer to a time when an event was detected or provided to the data collection manager 210.

Each of the event entries 310a-n may include some or all of the identifiers 312a-e shown in connection with the first event entry 310a. Other implementations may include additional or fewer identifiers, such as in examples where different RAN components have slightly different tracking capabilities. In one or more embodiments, the matrix generator 212 may normalize one or more of the identifiers prior to creating the event entries so that event instances tracked by different RAN components may be correlated where the events are determined to be similar enough to be included within the same event matrix (e.g., of a corresponding event type).

Figure 3B:
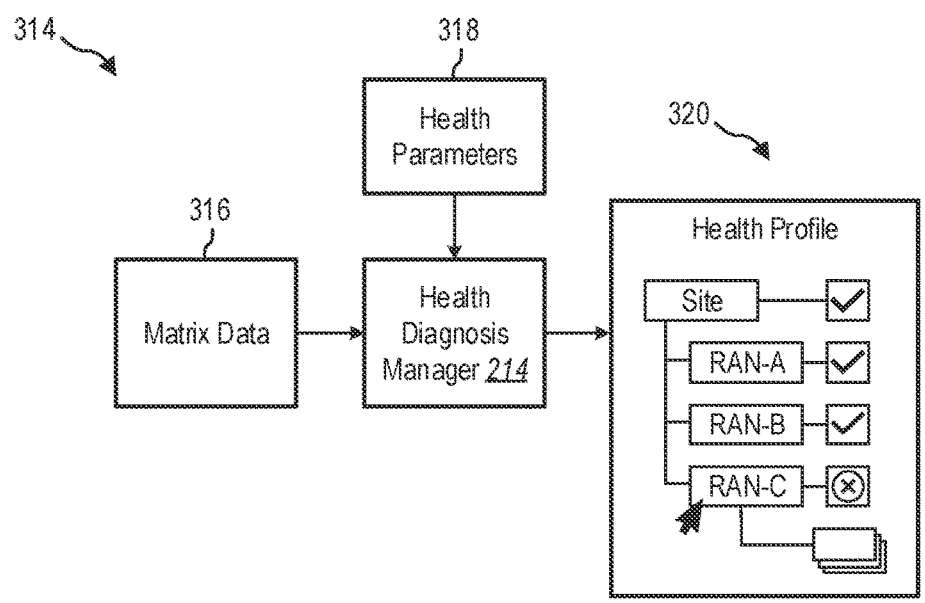
FIG. 3B illustrates an example implementation in which the RAN health management system generates a health profile showing a health state for a RAN site in accordance with one or more embodiments.

Turning now to FIG. 3B, additional information will be discussed in connection with an example workflow 314 for generating a health profile for a RAN site. It will be appreciated that a health profile may be generated for the RAN as a whole including health states for multiple RAN sites and corresponding components. As will be discussed below, an example health profile may be generated including health states for a particular RAN site and subcomponents of the RAN site (e.g., RAN components, SIM IDs).

As shown in FIG. 3B, the matrix generator 212 may provide matrix data 316 (e.g., event matrixes) to a health diagnosis manager 214. The health diagnosis manager 214 may determine health states for the RAN site and associated sub-components based on the matrix data 316. As shown in FIG. 3B, the health diagnosis manager 214 may determine health profile data for the RAN site based on the matrix data 316 and further in view of health parameters 318. As used herein, the health parameters 318 may include any information that may be used by the health diagnosis manager 214 to determine a health state of any component of a RAN. In one or more embodiments, the health parameters 318 include various health thresholds to consider in determining a health state of a RAN site, RAN component, and/or user device. The health parameters 318 may include specific thresholds of measurements, such as a threshold bandwidth that defines whether a RAN component is considered healthy and expected to perform as configured or unhealthy and predicted to underperform.

In one or more embodiments, the health parameters 318 may indicate threshold counts of detected events over some period of time for a given RAN site and/or RAN component. For example, a health parameter may indicate that a count of dropped communications that exceed a threshold count over a period of an hour would cause a RAN component associated with the dropped communications over the threshold count to be considered unhealthy. This threshold count may be applicable to specific RAN components, client devices, and/or RAN sites. The health parameters may include similar or different thresholds for different types of devices and components on the RAN.

It will be appreciated that the health diagnosis manager 214 may determine counts of specific events or network metrics based on the identifiers that have been tagged for respective event entries from the matrix data 316. For example, as noted above, because the event matrix(es) can include event identifiers, site identifiers, RAN identifiers, device identifiers, and timestamps, the health diagnosis manager 214 may accurately determine counts of a wide variety of events over very specific periods of time and for specific RAN components and client devices. These tagged identifiers, therefore, provide a valuable tool that enables the health diagnosis manager 214 to determine health states for RAN sites, RAN components, and even device identifiers.

As shown in FIG. 3B, the health diagnosis manager 214 may generate a health profile 320. The health profile 320 may refer to a report, document, or other data object including any health state information associated with components of a RAN site. In the example shown in FIG. 3B, the health profile 320 may include an indication of a RAN site and an associated health state (e.g., healthy, as indicated by a checkmark). The health profile 320 may additionally include an indication of RAN components and associated health states. For example, the health profile 320 may include a first healthy indicator for a first RAN component (RAN-A), a second healthy indicator for a second RAN component (RAN-B), and an unhealthy indicator for a third RAN component (RAN-C). The health profile 320 may additionally include health information for any number of devices that have interacted with or been associated with an event detected by the respective RAN components.

Figure 3C:
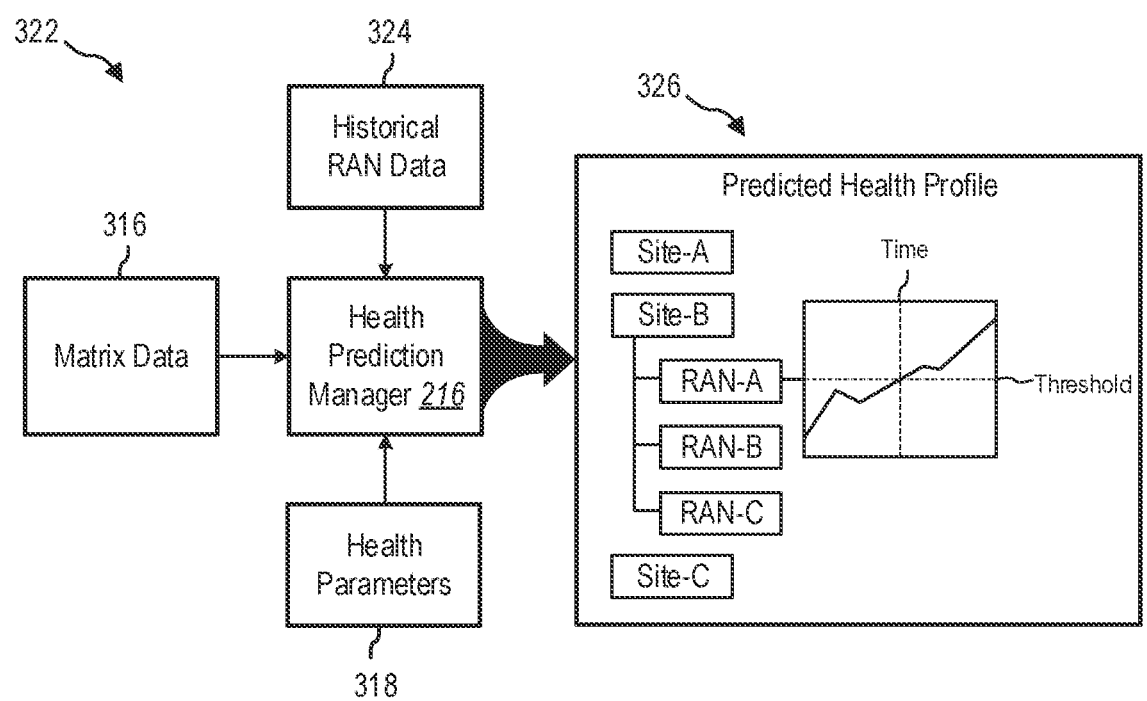
FIG. 3C illustrates an example implementation in which the RAN health management system generates a health prediction report showing a predicted health state for a RAN site in accordance with one or more embodiments.

Turning now to FIG. 3C, additional information will be discussed in connection with an example workflow 322 for generating a predicted health profile based on the matrix data and historical operational data associated with a RAN. For example, as shown in FIG. 3C, a health prediction manager 216 may receive matrix data 316, health parameters 318, and historical RAN data 324. As further shown, the health prediction manager 216 may generate a predicted health profile 326 for the RAN (e.g., including one or multiple RAN sites) indicating a predicted health status for any number of components of the RAN (e.g., RAN sites, RAN components, device identifiers).

In one or more embodiments, the health prediction manager 216 refers to a health prediction model or engine that is trained to predict a health state over some period of time based on the historical RAN data 324. For example, in one or more embodiments, the health prediction manager 216 refers to a machine learning model, such as a neural network, that learns health trends based on the historical RAN data 324 such that given an input matrix (e.g., the matrix data 316), the health prediction manager 216 may generate a predicted health profile for a RAN, a RAN site, and/or RAN components based on the input matrix.

In the illustrated example, the health prediction manager 216 may receive an input of the matrix data 316 and generate a predicted health profile 326 based on the learned trends and algorithms based on the historical RAN data 324. As shown in FIG. 3C, the predicted health profile 326 may include predicted health states over time for any number of RAN sites and RAN components. In the illustrated example, the predicted health profile 326 may provide a predicted trend over time indicating a time when the RAN component is predicted to enter unhealthy (or healthy) territory based on the matrix data 316 and based on the algorithms and trends learned by the health prediction manager 216.

Figure 4A:
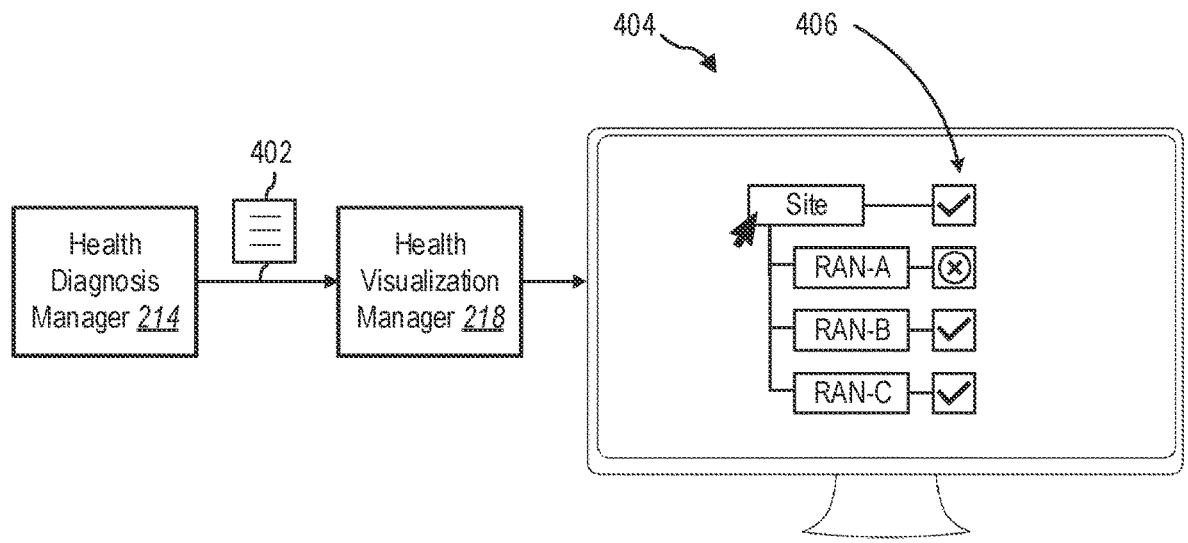
FIG. 4A illustrates an example implementation of a health profile presentation in accordance with one or more embodiments.
Figure 4B:
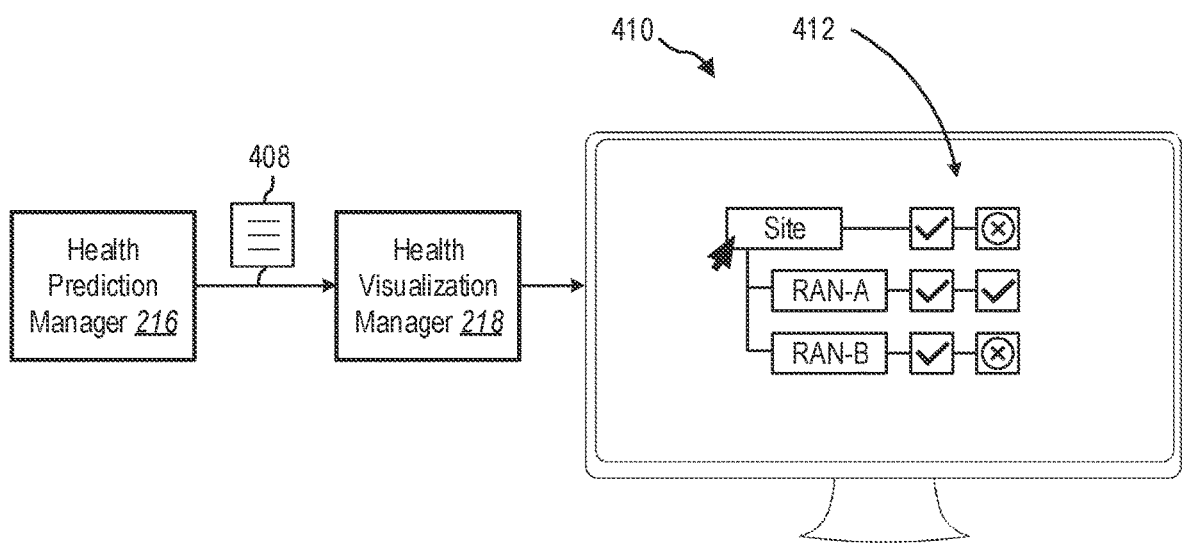
FIG. 4B illustrates another example implementation of a health profile presentation in accordance with one or more embodiments.

Turning now to FIGS. 4A-4B, additional detail will now be discussed in connection with example health profile presentations that may be generated and presented by the health visualization manager 218. FIG. 4A illustrates a first example implementation in which the health diagnosis manager 214 generates and provides a health profile report 402 to the health visualization manager 218. The health visualization manager 218 in turn may generate a health profile presentation to be displayed via a graphical user interface 406 on a client device 404.

As shown in FIG. 4A, the health profile presentation may include a plurality of icons associated with different components of a RAN. In this example, the health profile presentation may refer to a presentation for a specific RAN site including any number of RAN components. As shown in FIG. 4A, the health profile presentation may include a plurality of interactive icons that, when selected cause additional information to be displayed with respect to various sub-components. For example, a user may select a first icon associated with a RAN site and cause additional information to be displayed with respect to a plurality of RAN components (e.g., RAN-A, RAN-B, RAN-C). For instance, upon selection of the RAN site icon, the health visualization manager 218 may provide additional icons (e.g., RAN component icons) and associated health states. While not shown in FIG. 4A, one or more embodiments of the health visualization manager 218 may further enable selection of the specific RAN component icons to view additional health information with respect to more granular components, such as SIM IDs or other device identifiers associated with events tracked by the corresponding RAN components.

As shown in FIG. 4A, the health profile presentation may include a display of health states for each of the associated icons. In the illustrated example, a site icon may have a healthy indicator based on a comparison of certain events tracked with respect to the RAN site not exceeding any count thresholds or other conditions defined by health parameters for the RAN site. As further shown, the RAN icons may include a mix of healthy and unhealthy states based on a similar comparison of events and different health parameters that define the bounds of health states for the corresponding RAN components.

While FIG. 4A shows an example health profile presentation including a set of current health states, FIG. 4B shows an example health profile presentation including a predicted set of health states as determined by the health prediction manager 216. For example, as shown in FIG. 4B, the health prediction manager 216 may generate and provide a predicted health profile report 408 to the health visualization manager 218. In turn, the health visualization manager 218 may generate and provide a health profile presentation for display via a graphical user interface 412 of a client device 410.

The health profile presentation shown in FIG. 4B may include similar interactive icons and health state indicators as discussed above in connection with FIG. 4A. In addition, as further shown in FIG. 4B, the health profile presentation may include predicted health indicators for the corresponding RAN site(s) and RAN components based on the predicted health profile data included in the predicted health profile report 408.

It will be understood that the health profile presentation shown in FIG. 4B may be a product of both a health profile report generated by a health diagnosis manager 214 in combination with a predicted health profile report generated by the health prediction manager 216. For example, as shown in FIG. 4B, the health profile presentation may include an interactive icon for the RAN site, a first health indicator indicating a current health state for the RAN site, and a second health indicator indicating a predicted health state for the RAN site after some predetermined period of time (e.g., one hour, one day, one week, or selected future time frame). Similarly, the health profile presentation may include interactive icons for the RAN components, first health indicators indicating current health conditions for the RAN components, and second health indicators indicating predicted health conditions for the RAN components.

As shown in FIG. 4B, while one or more embodiments current health conditions may be healthy for the RAN site and/or RAN components, the health profile presentation may indicate that one or more RAN components and the RAN site may be predicted to experience unhealthy network conditions at some point in the future. This may be based on observed trends from historical data, such as increased activity over periods of time, or any other factor that affects performance of components on the RAN.

While not shown in FIGS. 4A-4B, the RAN health management system 116 may perform any number of acts to mitigate either current or predicted network health issues. For example, based on an observed unhealthy state for a given RAN component, the RAN health management system 116 may activate or increase capacity of one or more RANs on a particular RAN site. For instance, where the RAN health management system 116 observes a RAN site or specific RAN component experiencing bad health conditions or otherwise underperforming expectations, the RAN health management system 116 the RAN health management system 116 may activate one or more RAN components that are in a power saving mode, but that are not currently activated on the RAN site. This same principle may apply in preventing predicted instances of bad network performance. For example, in one or more embodiments, the RAN health management system 116 may facilitate mediation of future network issues based on predicted unhealthy states of RAN components and/or RAN sites even where the RAN components/sites are currently healthy.

Figure 5A:
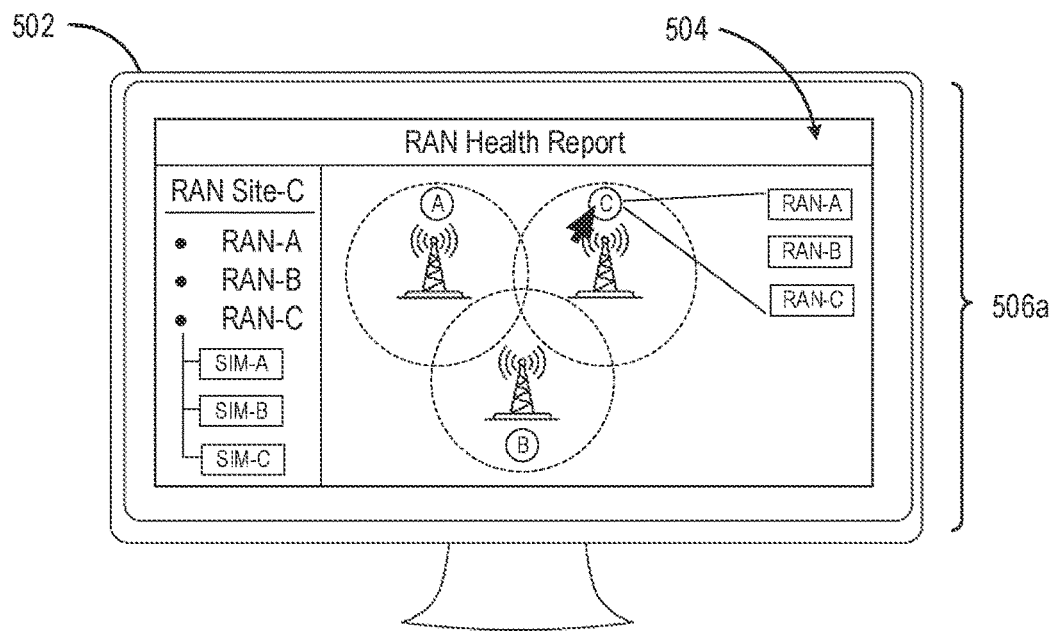
FIGS. 5A-5C illustrates example implementations of a health profile presentation as presented on a client device in accordance with one or more embodiments.
Figure 5B:
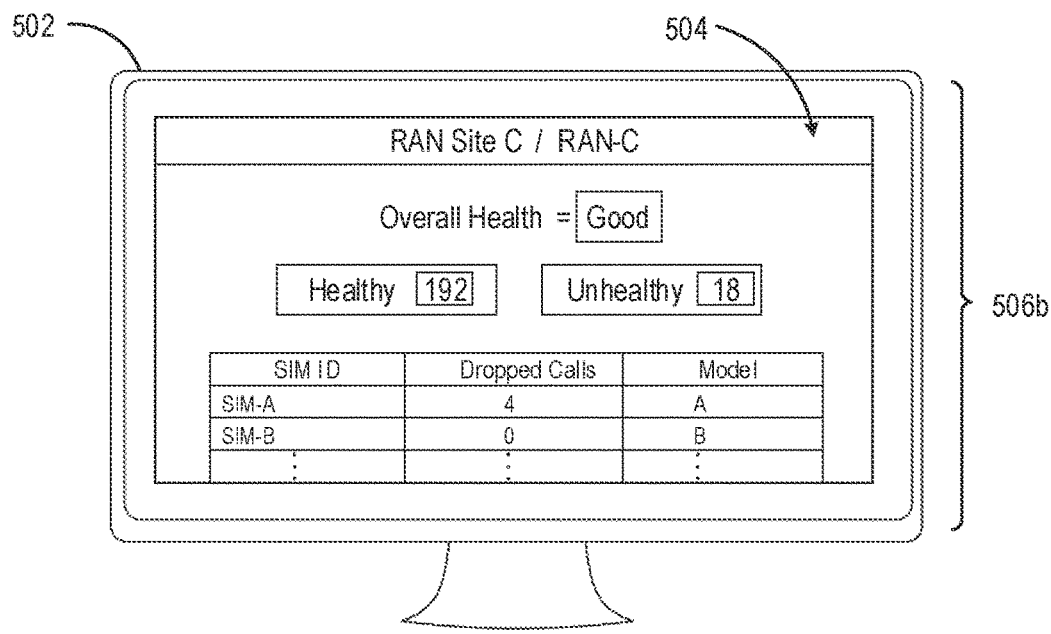
Figure 5C:
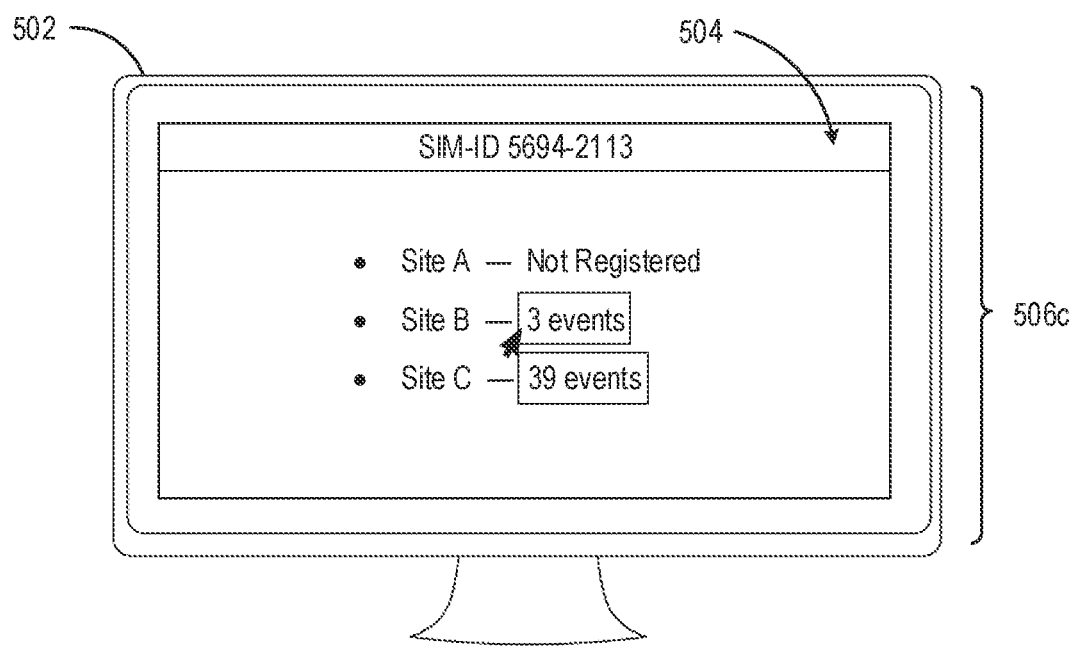

Turning now to FIGS. 5A-5C, these figures illustrate example implementations of the health profile presentation in accordance with one or more embodiments. While FIGS. 5A-5C illustrate examples showing a current health state of one or more RAN sites, it will be appreciated that features of the health profile presentations illustrated in FIGS. 5A-5C may similarly apply to predicted health states shown within a health profile presentation.

FIG. 5A illustrates a client device 502 having a graphical user interface 504 thereon for displaying a health profile presentation. As shown in FIG. 5A, the RAN health management system 116 may provide a first display 506a including a RAN health report for multiple RAN sites. As shown in the displayed example, a user of the client device 502 may select an icon for a RAN site (e.g., RAN site C) to view additional health information for the site. In response to detecting a selection of the RAN site, the RAN health management system 116 may provide additional icons (e.g., interactive icons) associated with RAN components of the selected RAN site. In one or more embodiments, a user may additionally select one of the RAN component icons to view additional health information for user devices (e.g., SIM IDs) that have been associated with detected events by the selected RAN component icon.

In one or more embodiments, the RAN health management system 116 may provide any health profile information in response to detecting a selected icon. For example, the RAN health management system 116 may provide data associated with events that have been detected in connection with a particular device, RAN component, or RAN site of the selected icon. In one or more embodiments, the RAN health management system 116 provides a health state for the site and/or RAN component of the selected icon. Indeed, the RAN health management system 116 may provide any relevant health profile information associated with the selected icon in response to a user selection of the interactive icon.

In one or more embodiments, the RAN health management system 116 enables a user to drill down and view additional information about a selected component or sub-component of the RAN. For example, as shown in FIG. 5B, the client device 502 may provide a second display 506b of the health profile presentation including health information for a selected RAN component based on selection of the RAN component within a previous display of the health profile presentation. In this example, the RAN health management system 116 may provide a second display 506b showing health profile information for a selected RAN component (RAN-C).

In the illustrated example, the second display 506b may include an indication of an overall health status (e.g., good) for the RAN component. This may include any number of terms or indicators ranging from not health to healthy. For example, this may indicate a range of 0 to 10 (or any other displayable scale) to indicate a health state for the selected RAN component. In accordance with one or more embodiments described above, the specific health status may be based on a comparison of detected event data for the RAN component over some period of time obtained from the health matrix(es) and health parameters that define various health thresholds.

As shown in FIG. 5B, the second display 506b may further include information about the respective device identifiers (e.g., SIM IDs). For example, the second display 506b may include a table of SIM IDs and associated statistics (e.g., event counts, event statistics) as well as additional known information about the respective devices (e.g., model types, manufacturer, etc.). This granularity of information may provide additional information about specific types of devices that may be underperforming or contributing to an unhealthy state of a RAN component and/or RAN site. In some embodiments, this additional information may inform an individual of what types of remedial actions to take, such as deactivating a SIM ID (e.g., where a specific SIM ID is monopolizing bandwidth) or simply acknowledging that certain models of devices are not performing with respect to a particular RAN site.

In the illustrated example, the second display 506b may indicate a count of healthy devices and unhealthy devices associated with the RAN component. In an example where the display shows a health profile for a RAN site, the count of healthy and unhealthy devices may refer to RAN components or a similar list of client device identifiers.

FIG. 5C illustrates an example implementation in which a user selects a particular device ID (e.g., SIM ID-5694-2113) to obtain additional information about the specific device identifier. For example, FIG. 5C shows a third display 506c indicating information about the SIM ID from the event matrix. As shown in FIG. 5C, this may include an indication of any number of RAN sites and associated events that have been tracked for the SIM ID. This view of the health profile presentation may provide helpful information in determining whether a particular device is experiencing certain events with respect to a specific cite, RAN component(s), or other portion of the RAN.

Figure 6:
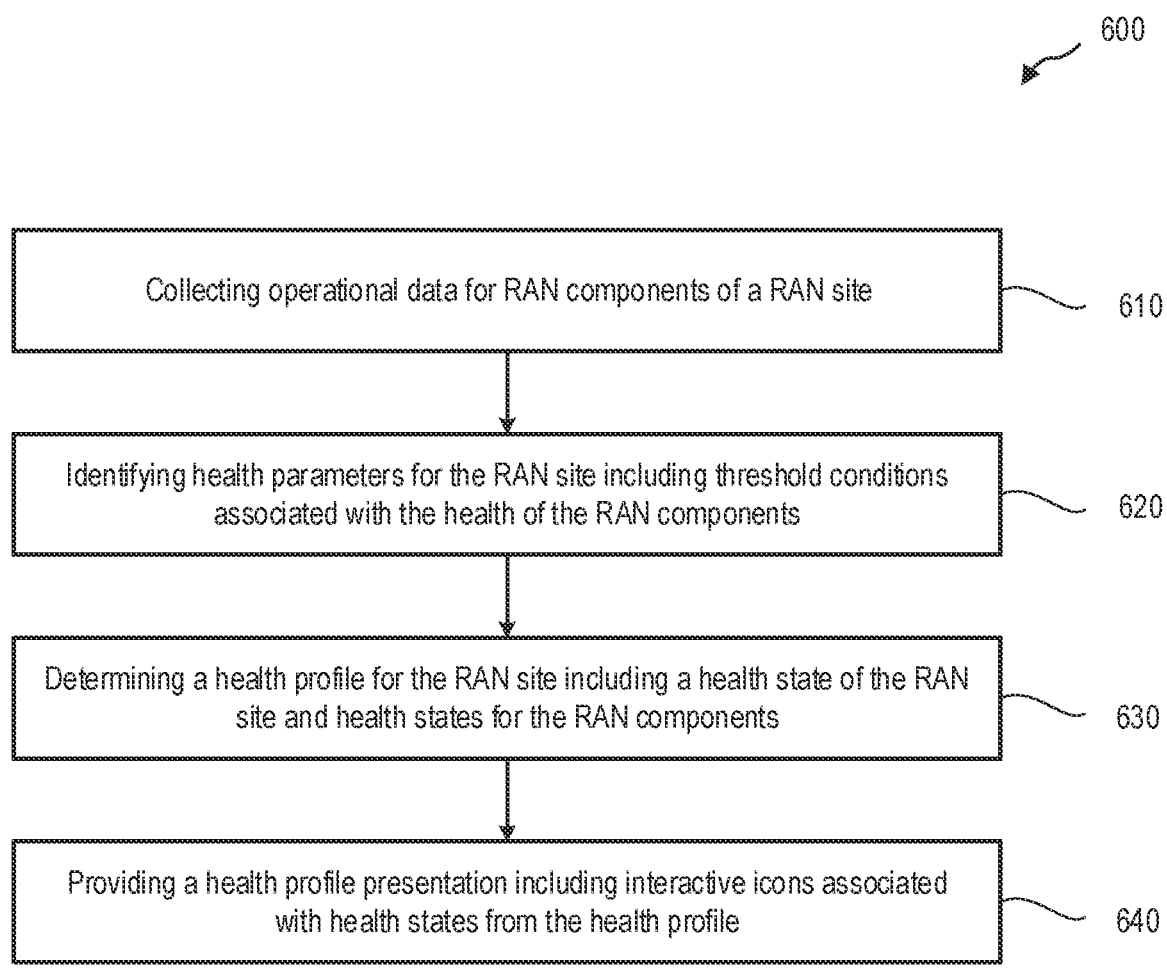
FIG. 6 illustrates an example series of acts for implementing the RAN health management system in accordance with one or more embodiments.

Turning now to FIG. 6, this figure illustrates an example flowchart including a series of acts for implementing features and functionalities described herein. While FIG. 6 illustrates acts according to one or more embodiments, alternative embodiments may omit, add to reorder, and/or modify any of the acts shown in FIG. 6. The acts of FIG. 6 may be performed as part of a method. Alternatively, a non-transitory computer-readable medium can include instructions thereon that, when executed by one or more processors, cause a server device and/or client device to perform the acts of FIG. 6. In still further embodiments, a system can perform the acts of FIG. 6.

FIG. 6 illustrates an example series of acts 600 for collection operational data from a plurality of RAN components and determining a health profile for a RAN site in accordance with one or more embodiments described herein. As shown in FIG. 6, the series of acts 600 includes an act 610 of collecting operational data for RAN components of a RAN site. For example, in one or more embodiments, the act 610 involves collecting operational data for a plurality of RAN components associated with a first RAN site.

In one or more embodiments, the operational data is locally tracked by agents on the plurality of RAN components. In one or more embodiments, the operational data includes a plurality of event streams received from the plurality of RAN components, the plurality of event streams including detected events associated with data signals tracked by agents on the plurality of RAN components.

As further shown in FIG. 6, the series of acts 600 may include an act 620 of identifying health parameters for the RAN site including threshold conditions associated with the health of the RAN components. For example, in one or more embodiments, the act 620 involves identifying health parameters for the first RAN site, the health parameters including one or more threshold conditions associated with the plurality of RAN components.

As further shown in FIG. 6, the series of acts 600 may include an act 630 of determining a health profile for the RAN site including a health state of the RAN site and health states for the RAN components. For example, the act 630 may involve determining a health profile for the first RAN site, the health profile including a first health state of the first RAN site and a plurality of health states for the plurality of RAN components.

As further shown in FIG. 6, the series of acts 600 may include an act 640 of providing a health profile presentation including interactive icons associated with health states from the health profile. For example, in one or more embodiments, the act 640 involves providing a health profile presentation, the health profile presentation including a plurality of interactive icons associated with health states from the health profile for the first RAN site.

In one or more embodiments, the series of acts 600 includes generating an event matrix from the operational data, the event matrix including a plurality of entries associated with events detected by the plurality of RAN components. Each of the plurality of entries may include a site identifier indicating the first RAN site, a RAN identifier indicating one of the plurality of RANs, and a timestamp indicating a time of an associated event. In one or more embodiments, each entry may further include a device identifier associated with an end-user device corresponding to the associated event.

In one or more embodiments, the event matrix includes counts of detected events over a predetermined period of time associated with the first RAN site and each RAN component of the plurality of RAN components. In one or more embodiments, determining the health profile for the first RAN site includes determining a count of detected events for each RAN component of the plurality of RAN components, comparing the count of detected events to a site event threshold of the first RAN site, and determining the health profile based on whether the count of detected events exceeds the site event threshold of the first RAN site.

In one or more embodiments, the health profile presentation includes an indication of the first health state of the first RAN site based on the determined health profile and a plurality of indications of health states of respective RAN components from the plurality of RAN components. Each indication of health state from the plurality of indications of health states may be based on the count of detected events determined for each RAN component.

In one or more embodiments, the series of acts 600 includes detecting a selection of a first interactive icon from the plurality of interactive icons associated with the first RAN site. In one or more embodiments, providing the health profile presentation may include providing, based on detecting the selection of the first interactive icon, a set of additional interactive icons indicating an individual health state for each of the plurality of RAN components associated with the first RAN site.

In one or more embodiments, the series of acts 600 includes detecting a selection of a first interactive icon from the plurality of interactive icons associated with the first RAN site. In one or more embodiments, providing the health profile presentation may include providing a count of detected events with respect to each RAN component from the plurality of RAN components associated with the first RAN site.

In one or more embodiments, the series of acts 600 includes detecting a selection of a first interactive icon. In one or more embodiments, providing the health profile presentation may include providing a listing of device identifiers and associated detected events considered in determining the health profile.

In one or more embodiments, the series of acts 600 includes collecting operational data for a second plurality of RAN components associated with a second RAN site, identifying the health parameters for the second RAN site, and determining a second health profile for the second RAN site, the second health profile including a second health state of the second RAN site and a second plurality of health states for the second plurality of RAN components. In one or more embodiments, the health profile presentation further includes a second plurality of interactive icons associated with health states from the second health profile for the second RAN site. In one or more embodiments, the health profile presentation includes a first interactive icon associated with the first RAN site that, when selected, causes the health profile presentation to include a display of individual health states for the plurality of RAN components associated with the first RAN site and a second interactive icon associated with the second RAN site that, when selected, causes the health profile presentation to include a display of individual health states for the second plurality of RAN components associated with the second RAN site.

Figure 7:
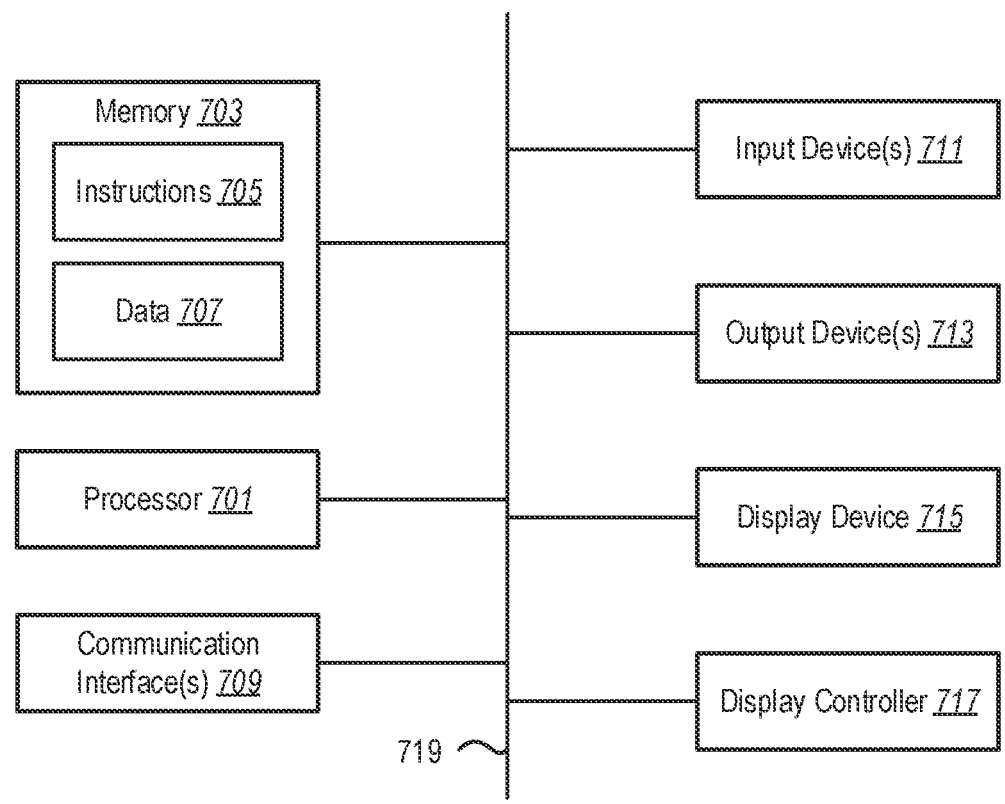
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD- ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for diagnosing health states for components of a radio access network (RAN) environment, the method comprising:
    collecting operational data for a plurality of RAN components, the plurality of RAN components comprising discrete components of a first RAN site;
    identifying health parameters for the first RAN site, the health parameters including one or more threshold conditions associated with the plurality of RAN components;
    determining a health profile for the first RAN site based on the operational data for the plurality of RAN components, the health profile including both a first health state indicating an overall health state of the first RAN site and a plurality of health states indicating individual health states of associated RAN components of for the plurality of RAN components, the overall health state being based at least in part on the plurality of health states; and
    providing a health profile presentation, the health profile presentation including a plurality of interactive icons associated with health states from the health profile for the first RAN site.

2. The method of claim 1, wherein the operational data is locally tracked by agents on the plurality of RAN components.

3. The method of claim 1, wherein the operational data comprises a plurality of event streams received from the plurality of RAN components, the plurality of event streams including detected events associated with data signals tracked by agents on the plurality of RAN components.

4. The method of claim 1, further comprising generating an event matrix from the operational data, the event matrix including a plurality of entries associated with events detected by the plurality of RAN components, wherein each entry from the plurality of entries includes:
    a site identifier indicating the first RAN site;
    a RAN identifier indicating one of the plurality of RANs; and
    a timestamp indicating a time of an associated event.

5. The method of claim 4, wherein each entry from the plurality of entries further includes a device identifier associated with an end-user device corresponding to the associated event.

6. The method of claim 4, wherein the event matrix further includes counts of detected events over a predetermined period of time associated with the first RAN site and each RAN component of the plurality of RAN components.

7. The method of claim 6, wherein determining the health profile for the first RAN site includes:
    determining a count of detected events for each RAN component of the plurality of RAN components;
    comparing the count of detected events to a site event threshold of the first RAN site; and
    determining the health profile based on whether the count of detected events exceeds the site event threshold of the first RAN site.

8. The method of claim 7, wherein the health profile presentation includes:
    an indication of the first health state of the first RAN site based on the determined health profile; and
    a plurality of indications of health states of respective RAN components from the plurality of RAN components, each indication of health state from the plurality of indications of health states being based on the count of detected events determined for each RAN component.

9. The method of claim 1, further comprising detecting a selection of a first interactive icon from the plurality of interactive icons associated with the first RAN site, wherein providing the health profile presentation includes providing, based on detecting the selection of the first interactive icon, a set of additional interactive icons indicating an individual health state for each of the plurality of RAN components associated with the first RAN site.

10. The method of claim 1, further comprising:
    detecting a selection of a first interactive icon from the plurality of interactive icons associated with the first RAN site, wherein providing the health profile presentation includes providing a count of detected events with respect to each RAN component from the plurality of RAN components associated with the first RAN site; and
    detecting a selection of a first interactive icon associated with the first RAN site, wherein providing the health profile presentation includes providing a listing of device identifiers and associated detected events considered in determining the health profile.

11. The method of claim 1, the method further comprising:
collecting operational data for a second plurality of RAN components associated with a second RAN site;
identifying the health parameters for the second RAN site; and
determining a second health profile for the second RAN site, the second health profile including a second overall health state of the second RAN site and a second plurality of health states for the second plurality of RAN components, the second overall health state being based at least in part on the second plurality of health states,
wherein the health profile presentation further includes a second plurality of interactive icons associated with health states from the second health profile for the second RAN site.

12. The method of claim 11, wherein the health profile presentation includes:
a first interactive icon associated with the first RAN site that, when selected, causes the health profile presentation to include a display of individual health states for the plurality of RAN components associated with the first RAN site; and
a second interactive icon associated with the second RAN site that, when selected, causes the health profile presentation to include a display of individual health states for the second plurality of RAN components associated with the second RAN site.

13. The method of claim 1, wherein the plurality of interactive icons includes:
a first set of icons indicating current health states from the health profile for the first RAN site; and
a second set of icons indicating predicted health states from the health profile for the first RAN site.

14. The method of claim 1,
wherein collecting the operational data includes maintaining a record of events detected by the discrete components of the plurality of RAN components, and
wherein determining the health profile includes:
maintaining a count of detected events from the record of events; and
determining the first health state and the second health state of the health profile based on a comparison of the count of detected events to one or more threshold counts of events associated with the first RAN site.

15. A system, comprising:
at least one processor;
memory in electronic communication with the at least one processor; and
instructions stored in the memory, the instructions being executable by the at least one processor to:
collect operational data for a plurality of RAN components, the plurality of RAN components comprising discrete components of a first RAN site;
identify health parameters for the first RAN site, the health parameters including one or more threshold conditions associated with the plurality of RAN components;
determine a health profile for the first RAN site based on the operational data for the plurality of RAN components, the health profile including both a first health state indicating an overall health state of the first RAN site and a plurality of health states indicating individual health states of associate RAN components of for the plurality of RAN components, the overall health state being based at least in part on the plurality of health states; and
provide a health profile presentation, the health profile presentation including a plurality of interactive icons associated with health states from the health profile for the first RAN site.

16. The system of claim 15, wherein the operational data comprises a plurality of event streams received from the plurality of RAN components, the plurality of event streams including detected events associated with data signals tracked by agents on the plurality of RAN components.

17. The system of claim 15, wherein the instructions are further executable by the at least one processor to generate event matrix from the operational data, the event matrix including a plurality of entries associated with events detected by the plurality of RAN components, wherein each entry from the plurality of entries includes:
a site identifier indicating the first RAN site;
a RAN identifier indicating one of the plurality of RANs;
a timestamp indicating a time of an associated event; and
a device identifier associated with an end-user device corresponding to the associated event.

18. The system of claim 17, wherein the event matrix further includes counts of detected events over a predetermined period of time associated with the first RAN site and each RAN component of the plurality of RAN components, and wherein determining the health profile for the first RAN site includes:
determining a count of detected events for each RAN component of the plurality of RAN components;
comparing the count of detected events to a site event threshold of the first RAN site; and
determining the health profile based on whether the count of detected events exceeds the site event threshold of the first RAN site.

19. The system of claim 15, wherein the instructions are further being executable by the at least one processor to:
collect operational data for a second plurality of RAN components associated with a second RAN site;
identify the health parameters for the second RAN site; and
determine a second health profile for the second RAN site, the second health profile including a second overall health state of the second RAN site and a second plurality of health states for the second plurality of RAN components, the second overall health state being based at least in part on the second plurality of health states,
wherein the health profile presentation further includes a second plurality of interactive icons associated with health states from the second health profile for the second RAN site.

20. A non-transitory computer readable medium storing instructions thereon that, when executed by at least one processor, causes a computing device to:
collect operational data for a plurality of RAN components, the plurality of RAN components comprising discrete components of a first RAN site;
identify health parameters for the first RAN site, the health parameters including one or more threshold conditions associated with the plurality of RAN components;
determine a health profile for the first RAN site based on the operational data for the plurality of RAN components, the health profile including both a first health state indicating an overall health state of the first RAN site and a plurality of health states indicating individual health states of associate RAN components of the plurality of RAN components, the overall health state being based at least in part on the plurality of health states; and provide a health profile presentation, the health profile presentation including a plurality of interactive icons associated with health states from the health profile for the first RAN site.

\* \* \* \* \*